Sept. 13, 1966   G. S. PARK   3,272,552
LATCH AND TAILGATE OPERATING MECHANISM FOR TRUCK BODIES
Filed Jan. 15, 1964
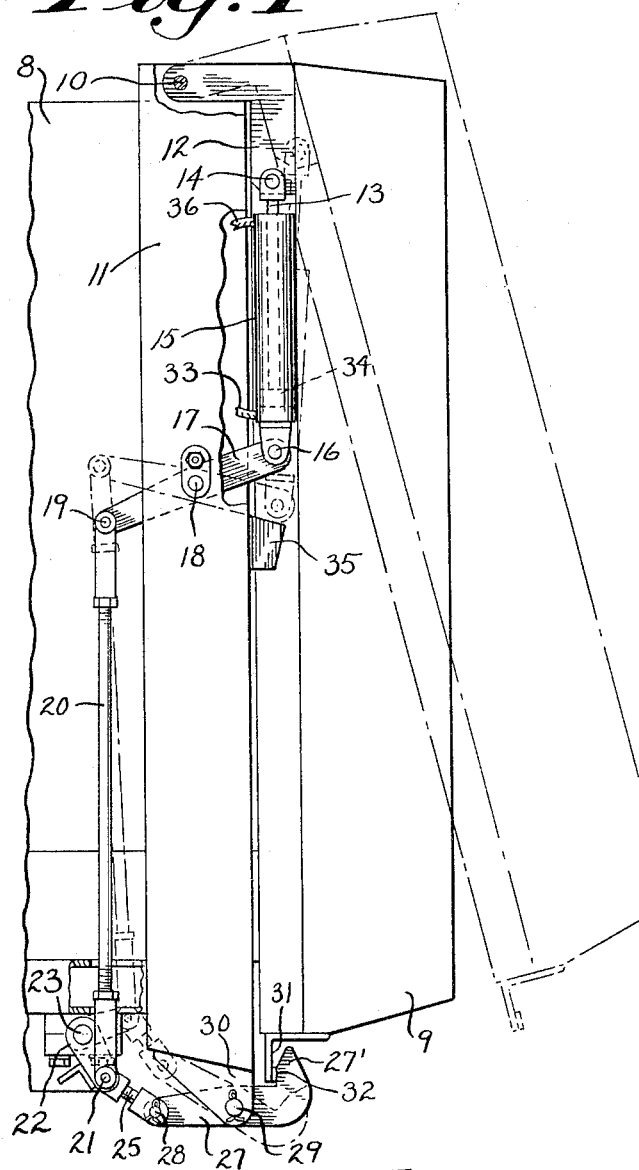
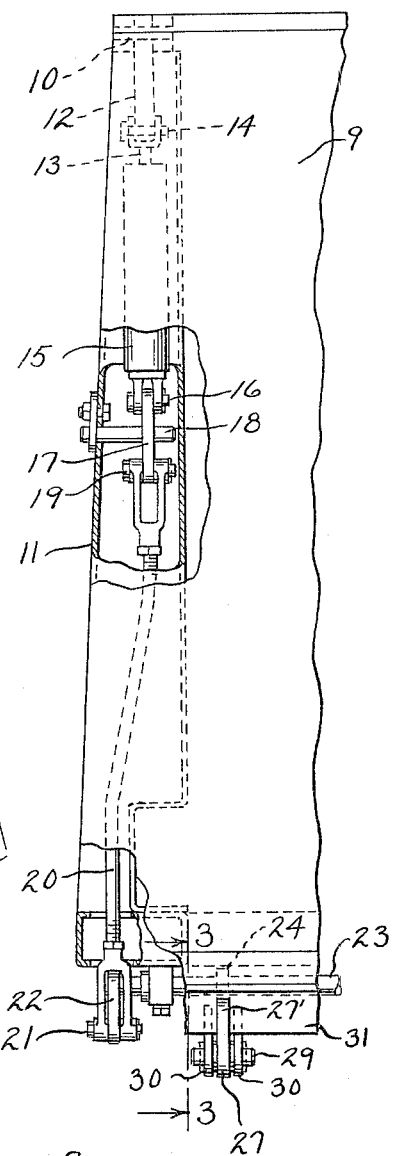
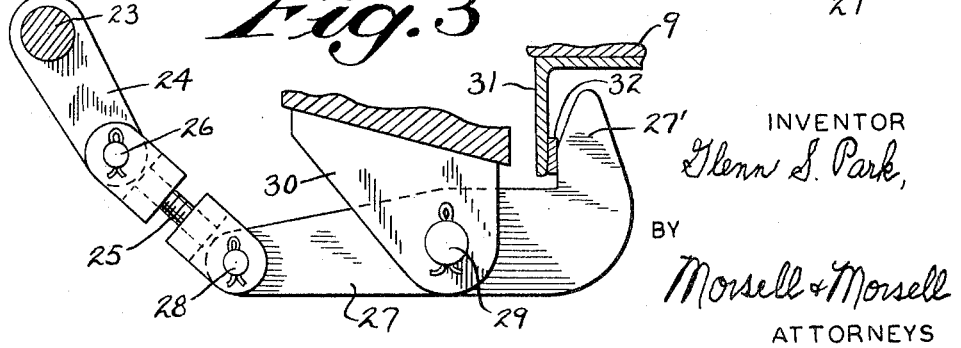
INVENTOR
Glenn S. Park,
BY
Morsell & Morsell
ATTORNEYS

United States Patent Office 3,272,552
Patented Sept. 13, 1966

3,272,552
LATCH AND TAILGATE OPERATING MECHANISM FOR TRUCK BODIES
Glenn S. Park, New Berlin, Wis., assignor to The Heil Co., Milwaukee, Wis., a corporation of Wisconsin
Filed Jan. 15, 1964, Ser. No. 337,853
7 Claims. (Cl. 296—56)

This invention relates to improvements in latch and tailgate operating mechanism for truck bodies, and more particularly to powered mechanism which is particularly adapted for use in connection with the tailgate of a side loader refuse truck body, or the like.

In certain types of vehicular refuse bodies the refuse collected within the body will pack against the latched tailgate of the body, creating such forces on the latch mechanism that manual manipulation of the latch (the conventional expedient) is difficult. It has heretofore been conventional to provide hydraulically operated means for opening a truck body tailgate but such conventional arrangements have been devoid of any means for also operating the tailgate latch.

With the foregoing in mind it is, therefore, the primary object of the present invention to provide in a truck body, combined powered means for both operating the truck body tailgate and for operating the tailgate latch in proper sequence.

A further object of the invention is to provide a powered tailgate latch-operating and gate-operating mechanism for truck bodies wherein the mechanism, which is effective to swing the tailgate both to and from closed position, will also function to move the tailgate latches both into and out of latching positions, at proper times in the cycle of operation.

A more specific object of the invention is to provide, in a mechanism of the character described, lever means associated with and operated by the tailgate operating hydraulic rams which are also operatively connected to the tailgate latches for automatically operating the same.

A further object of the invention is to provide, in a tailgate equipped vehicular body, powered means for both operating the tailgate latches and for operating the tailgate, which means can be readily, operatively associated with the tailgate of a truck body.

A further object of the invention is to provide a tailgate latch-operating and gate-operating mechanism for truck bodies which is of relatively inexpensive construction, is effective and efficient in its operation, which is strong and durable, and which is otherwise well adapted for the purposes described.

With the above and other objects in view, the invention consists of the improved latch and tailgate operating mechanism for truck bodies, and its parts and combinations, as set forth in the claims, and all equivalents thereof.

In the accompanying drawing, in which the same reference characters indicate the same parts in all of the views:

FIG. 1 is a fragmentary side view of the tailgate equipped end portion of a refuse truck body provided with the improved latch and tailgate-operating mechanism, parts being broken away and shown in section;

FIG. 2 is a fragmentary rear view of the tailgate portion of a refuse truck body with portions broken away and shown in section; and FIG. 3 is an enlarged fragmentary detail sectional view taken approximately along the line 3—3 of FIG. 2.

Referring now more particularly to the drawing, it will appear that a vehicular truck body is designated generally by the numeral 8. The truck body is preferably of the type which is used for refuse collection and may be equipped with a side loading opening (not shown), although the present improvements are applicable to tailgate equipped truck bodies generally. The numeral 9 indicates the tailgate for the truck body 8 and the upper end of the same, at opposite corners, is pivotally mounted, as at 10, on the rear collar portion 11 of the truck body.

The improved latch and gate-operating mechanism is identical on both sides of the collar 11 and tailgate 9. Hence, only one of such assemblages has been illustrated and will be described. As will best appear from FIG. 1, upper corner portions of the tailgate 9 which are pivotally mounted to the body collar 11, as at 10, have angular pivot brackets 12. Pivotally connected to a depending portion of each bracket as at 14 is the upper end of a ram 13, the ram being an element of a conventional double-acting hydraulic jack which includes a cylinder 15. The lower end portion of the cylinder 15 is pivotally connected, as at 16, to a lever 17 which is pivotally mounted intermediate its ends on a collar-carried pivot shaft 18.

The other end of the lever 17 is pivotally connected, as at 19, to the upper, clevis-end portion of a connecting rod 20. The lower end portion of the connecting rod 20 is also formed as a clevis and is pivotally connected, as at 21, to a lever arm 22 whose other end is mounted fast on the end portion of a transverse rock shaft 23 extending across the rear of the truck body. The rock shaft 23, inwardly of the lower end of the connecting rod 20, has mounted fast thereon one end portion of an arm 24 (see FIG. 3), said arm 24 being in coincidence with the lever arm 22 when viewed as in FIG. 1. The outer or lower end portion of the arm 24 extends between the arms of an adjustable double clevis member 25 and is pivotally connected thereto, as at 26. One end portion of an angularly-shaped latching lever 27 is pivotally connected, at at 28, between the bifurcations of the other end of the clevis 25. The latching lever 27 extends substantially horizontally rearwardly and is pivotally mounted intermediate its ends on a pivot stud 29 mounted through a pair of spaced-apart flanges 30 which depend from a base portion of the body collar 11.

The numeral 31 designates the vertical flange of an angle member secured to and epending from the bottom margin of the tailgate 9, and the outer, upwardly-angled nose portion 27' of the latch lever 27 is adapted to normally engage over a facing strip 32 on the flange 31 to releasably latch the tailgate in its closed position, shown in full lines in FIG. 1, when the latch and gate-operating mechanism is in the position of FIG. 3 or in the full-line position of FIG. 1.

When the latch and gate-operating mechanism is to be operated, hydraulic fluid is admitted into the jack cylinder 15 through a conduit 33 by means well known in the art, and this hydraulic fluid, acting below the ram piston 34 within the jack cylinder 15, will be effective to telescopically extend the parts. The initial force on the cylinder 15 will be effective to exert such pressure on the pivotally-connected end portion 16 of the lever 17 as to cause the lever 17 to rock in a clockwise direction relative to FIG. 1 until it abuts a stop block 35 mounted fast on the truck body collar 11. The clockwise pivotal movement of the lever 17 will raise the connecting rod 20 and shift it to the broken-line position of FIG. 1, and such lifting movement of the connecting rod 20 will swing the lever arm 22 in a counter-clockwise direction and thus rock the transverse rock shaft 23 in a counter-clockwise direction whereby the arm 24, carried inwardly on the rock shaft 23, will be similarly rocked in a counter-clockwise direction relative to FIGS. 1 and 2 which, through the double clevis connector 25, will lift up on the inner end of the latch lever 27 and cause the same to rock to the broken-line position of FIG. 1, disengaging the tailgate-carried angle plate 31, whereby the tailgate latch is released through power means. Then, further hydraulic operation will now cause projection of the hydraulic jack ram 13 because the stop block 35 on the body prevents further movement of the cylinder 15. This will act on the pivotally-hung tailgate, with reaction against the stop block 35, and will cause the tailgate to be swung toward its open position as is shown in broken lines in FIG. 1.

When the tailgate is to be lowered, the hydraulic jack 15, which is double acting, has hydraulic fluid admitted to the cylinder 15 through the conduit 36 and a reverse action takes place to initially effect a swinging movement of the tailgate from its open to its closed position, followed by a pivotal movement of the latch lever 27 to the full-line latching position shown in FIG. 1. During the movement of the latch-operating mechanism the lever 17 will rock in a counter-clockwise direction relative to FIG. 1, shifting the pivotal connection 16 from the lower position to the raised full-line position, wherein the cylinder is in its raised position with the ram 13 retracted. It is to be noted that in latching position the pivot 26 (FIG. 3) is moved past dead center. Thus the latches cannot be accidentally released.

From the foregoing description it will be evident that the improved latch and gate-operating mechanism is readily applicable to any type of vehicle body equipped with a tailgate, and provides a powered means for both operating the tailgate latch and for swinging the tailgate. In refuse bodies wherein the refuse may pack tightly against the latched tailgate the improved powered operating mechanism renders it possible to effectively and expeditiously release the tailgate latch regardless of load pressures reacting thereagainst, and the power that is utilized in connection with effecting the swinging movements of the tailgate is translated, through the connections described, to the tailgate latching lever. The tailgate latch-releasing and gate-opening mechanism is easily operated, is simple and susceptible of ready incorporation in the body and tailgate assemblage, and is well adapted for the purposes described.

What is claimed as the invention is:

1. In combination with a truck body having mounted thereon a pivotal tailgate and a pivotal tailgate latch: a lever intermediately pivotally mounted on said body to rock in a vertical plane, mechanical connections extending from one end portion of said lever to the latch for actuating the latter, an hydraulic jack pivotally carried by the other end portion of said lever and extending to and engaging the tailgate, and stop means rigidly mounted on the body for limiting the rocking movement of said lever in one direction during which movement the mechanical connections actuate the latch following which the jack extends to pivot the tailgate.

2. In combination with a truck body having a gate pivotally mounted thereon at its upper portion for opening and closing movement on a horizontal axis and having pivotal latching means positioned for engagement with a lower portion of said gate, a hydraulic jack pivotally connected at one end to an upper portion of said gate, latch-operating means on said body, means between said latch-operating means and the other end of said hydraulic jack for causing forced release movement of said latching means when the jack is first operated, and a reaction member on the body positioned to be thereafter engaged by said hydraulic jack to cause powered raising of the gate after said release of the latching means.

3. In combination with a truck body having a gate pivotally mounted thereon at its upper portion for opening and closing movement on a horizontal axis and having pivotal latching means positioned for engagement with a lower portion of said gate, a generally vertically disposed hydraulic jack pivotally connected at its upper end to an upper portion of said gate, latch-operating means on said body, means between said latch-operating means and the lower end of said hydraulic jack for causing forced release of said latching means when the jack is first operated, and a reaction member on the body positioned to be thereafter engaged by said hydraulic jack to cause powered raising of the gate after said release of the latching means.

4. In combination with a truck body having a gate pivotally mounted thereon at its upper portion for opening and closing movement on a horizontal axis and having pivotal latching means positioned for engagement with a lower portion of said gate, a generally vertically disposed hydraulic jack pivotally connected at its upper end to an upper portion of said gate, latch-operating means on said body, a lever pivoted intermediate its length to said body and pivotally connected at one end to said latch-operating means, means between the other end of said lever and the lower end of said hydraulic jack for causing pivotal movement of the lever and forced release of said latching means when said jack is first operated, and a reaction member on the body positioned to be thereafter engaged by said hydraulic jack to cause powered raising of the gate after said release of the latching means.

5. In combination with a truck body having a gate pivotally mounted thereon at its upper portion for opening and closing movement on a horizontal axis, means including a latch pivotally connected to the body in a position adjacent a lower portion of said gate for latching the latter, a horizontal rock shaft journaled in said body near said latch, a crank arm rigidly connected to said rock shaft, means between said crank arm and latch for operating the latter when the rock shaft is rocked, an hydraulic jack pivotally connected at its upper end to an upper portion of said gate, means between said rock shaft and the lower end of the hydraulic jack for causing rocking of said rock shaft and positive movement of said latch to releasing position when said jack is first operated, and a reaction member on the body positioned to be thereafter engaged by said hydraulic jack to cause powered raising of the gate after said operation of the rock shaft.

6. In combination with a truck body having a gate pivotally mounted thereon at its upper portion for opening and closing movement on a horizontal axis, means including a latch pivotally connected to the body in a position adjacent a lower portion of said gate for latching the latter, a horizontal rock shaft journalled in said body near said latch, a crank arm rigidly connected to said rock shaft, means between said crank arm and latch for operating the latter when the rock shaft is rocked, an hydraulic jack pivotally connected at its upper end to an upper portion of said gate, a lever pivoted intermediate its length to said body intermediate the height of the latter, means between one end of said lever and said rock shaft for causing rocking of the latter when said lever is pivotally moved, a pivotal connection between the other end of said lever and the lower end of said hydraulic jack whereby said latch is moved to releasing position when said hydraulic jack is first operated, and a reaction member on the body positioned to be thereafter engaged by said hydraulic jack to cause powered raising of the gate after said release of the latch.

7. In combination with a truck body having mounted thereon a pivotal gate and a pivotal gate latch: a lever intermediately pivotally mounted on said body, mechanical connections extending from one end portion of said lever to the latch for actuating the latter, an hydraulic jack pivotally carried by the other end portion of said lever and extending to and engaging the gate, and stop means rigidly mounted on the body for limiting the rocking movement of said lever in one direction during which movement the mechanical connections actuate the latch following which the jack extends to pivot the gate.

References Cited by the Examiner
UNITED STATES PATENTS

| | | | |
|---|---|---|---|
| 210,112 | 11/1918 | Gadbouis | 296—56 X |
| 1,983,280 | 12/1934 | Flowers | 298—23 |
| 2,260,080 | 10/1941 | Lane | 268—75 |
| 2,538,980 | 1/1951 | Payne | 268—75 |
| 2,558,867 | 7/1951 | May | 268—75 |

BENJAMIN HERSH, *Primary Examiner.*
P. GOODMAN, *Assistant Examiner.*